United States Patent
Sastre-Cordova et al.

(10) Patent No.: US 11,472,524 B2
(45) Date of Patent: Oct. 18, 2022

(54) INTEGRATED ACOUSTIC LOCALIZATION AND COMMUNICATIONS ARRAY

(71) Applicant: Raytheon Company, Waltham, MA (US)

(72) Inventors: Marcos M. Sastre-Cordova, Warren, RI (US); Sarah J. Silva, South Dartmouth, MA (US); Thomas Peirce, III, Westport, MA (US)

(73) Assignee: Raytheon Company, Waltham, MA (US)

( * ) Notice: Subject to any disclaimer, the term of this patent is extended or adjusted under 35 U.S.C. 154(b) by 65 days.

(21) Appl. No.: 16/834,063

(22) Filed: Mar. 30, 2020

(65) Prior Publication Data

US 2021/0300511 A1    Sep. 30, 2021

(51) Int. Cl.
*H04B 13/02* (2006.01)
*B63C 11/26* (2006.01)
(Continued)

(52) U.S. Cl.
CPC ............... *B63C 11/26* (2013.01); *G01S 1/72* (2013.01); *G01S 3/80* (2013.01); *H04B 11/00* (2013.01); *H04B 13/02* (2013.01)

(58) Field of Classification Search
CPC ... B63C 11/26; G01S 1/72; G01S 3/80; H04B 11/00; H04B 13/02
See application file for complete search history.

(56) References Cited

U.S. PATENT DOCUMENTS

| 5,429,136 A | * | 7/1995 | Milo | A61B 8/12 600/439 |
| 5,678,643 A | * | 10/1997 | Robbins | G01V 1/46 175/45 |

(Continued)

FOREIGN PATENT DOCUMENTS

CN    101872020 A  * 10/2010

OTHER PUBLICATIONS

Dajun Sun, "Sound velocity correction based on effective sound velocity for underwater acoustic positioning systems", Mar. 8, 2019, Elsevier Ltd., p. 6 (Year: 2019).*

(Continued)

*Primary Examiner* — Isam A Alsomiri
*Assistant Examiner* — Abdallah Abulaban
(74) *Attorney, Agent, or Firm* — Renner, Otto, Boisselle & Sklar, LLP (57) ABSTRACT

A compact, integrated acoustic localization and communications array includes an air-backed transmit element having a first end on which an end cap is disposed, and a second end configured to be mounted to a mounting surface. A volumetric acoustic array including a plurality of receiver elements that is electrically integrated to the transmit element. The localization and communications array is configured to transmit, via the transmit element, and receive, via the plurality of the receiver elements, an acoustic signal having a frequency in the range of 10 kHz to 50 kHz. Each of the plurality of receiver elements are spaced apart from the end cap at least a distance. The distance is greater than ¼ of a wavelength associated with the frequency transmitted and received by the localization and communications array, and is not equal to an odd multiple of ¼ of the wavelength.

20 Claims, 6 Drawing Sheets

(51) Int. Cl.
  *G01S 1/72* (2006.01)
  *G01S 3/80* (2006.01)
  *H04B 11/00* (2006.01)

(56) References Cited

U.S. PATENT DOCUMENTS

| | | | |
|---|---|---|---|
| 6,514,618 B1 * | 2/2003 | McKeighen | B32B 7/02 367/162 |
| 9,645,223 B2 | 5/2017 | Megdal | |
| 2013/0272098 A1 | 10/2013 | Cahalan | |
| 2016/0315717 A1 | 10/2016 | Cahalan | |
| 2017/0026135 A1 | 1/2017 | Cahalan | |
| 2019/0242985 A1 * | 8/2019 | Ishii | G01S 7/521 |

OTHER PUBLICATIONS

Beaujean, Pierre-Philippe J, "Acoustic positioning using a tetrahedral ultrashort baseline array of an acoustic modem source transmitting frequency-hopped sequences", Jan. 2007, Acoustical Society of America (Year: 2007).*

Sun Dajun et al: "Sound velocity correction based on effective sound velocity for underwater acoustic positioning systems". Applied Acoustics, vol. 151, Aug. 1, 2019, pp. 55-62, pp. 144, 145.

International Search Report and Written Opinion dated May 26, 2021 for corresponding International Application No. PCT/US2021/012430.

Beaujean, Pierre-Philippe et al., Acoustic positioning using a tetrahedral ultrashort baseline array of an acoustic modem source transmitting frequency-hopped sequences, J. Acoust. Soc. Am., vol. 121, No. 1, Jan. 2007, 144-157.

* cited by examiner

INTEGRATED ACOUSTIC LOCALIZATION AND COMMUNICATIONS ARRAY

TECHNICAL FIELD

The present invention relates generally to underwater acoustic positioning systems, and more particularly to a compact, integrated acoustic localization and communications array.

BACKGROUND

In an underwater environment, locating and tracking object with the use of GPS or other RF signals is not practical, as high frequency radio waves do not propagate through water. Accordingly, ultra-short baseline (USBL) underwater acoustic positioning systems are used for accurately locating and tracking various objects of interest in an underwater environment. An underwater acoustic positioning system typically includes a submersible transmitter that is, for example, mounted on the bottom of a ship, and a transponder that is on the seafloor or mounted to some other underwater object of interest. An acoustic signal is transmitted by the ship-mounted transmitter and detected by the object's transponder, which replies with its own acoustic pulse. A ship-mounted transducer, then, detects the return acoustic pulse. The USBL system measures the time from transmission of the initial acoustic pulse until the reply is detected and converts this measurement into a range. Additionally, the angle from the transceiver to the underwater object may be calculated. In this way, the USBL system is capable of accurately locating and tracking the object in the underwater environment.

SUMMARY

A compact, integrated acoustic localization and communications array is disclosed herein. The compact, integrated acoustic localization and communications array consists of a volumetric, USBL transducer array, referred to herein as the "volumetric acoustic array," and integrated acoustic communications transmitter, referred to herein as "transmit unit," integrated and packaged together in close proximity to form a low-volume form factor. Specifically, the compact, integrated acoustic localization and communications array may be provided in a package having dimensions as small as 3.81 centimeters (1.5 inches) by 5.08 centimeters (2 inches). The compact, integrated acoustic localization and communications array, therefore, provides advantageous size, weight and power (SWAP) for small form-factor applications.

Specifically, the compact, integrated acoustic localization and communications array consists of a plurality of receiver elements precisely positioned at their minimum required baseline separation. The plurality of receiver elements, which together form a volumetric acoustic array, are integrated in a packaging having a small form factor with the transmit unit to form the compact, integrated acoustic localization and communications array having joint acoustic communications (ACOMMs) and localization capability. Additionally, a method of manufacturing the compact, integrated acoustic localization and communications array consistently achieves the required baseline separation of the receiver elements, as well as their required separation from the transmit unit and any surface to which it is mounted, so as to avoid interference that may be caused.

According to an aspect of the invention, a compact, integrated acoustic localization and communications array ("integrated array") is provided. The integrated array includes an air-backed transmit element having a first end on which an end cap is disposed, and a second end configured to be mounted to a mounting surface. The integrated array also includes a volumetric acoustic array including a plurality of receiver elements electrically integrated to the transmit element. The integrated array is configured to transmit, via the transmit element, and receive, via the plurality of the receiver elements, an acoustic signal having a frequency in the range of 10 kHz to 50 kHz. Each of the plurality of receiver elements are spaced apart from the end cap at least a distance, the distance being greater than ¼ of a wavelength associated with the frequency transmitted and received by the integrated array, and the distance not being equal to an odd multiple of ¼ of the wavelength associated with the frequency transmitted and received by the integrated array.

According to an embodiment of any paragraph(s) of this summary, the volumetric acoustic array is a tetrahedral acoustic array.

According to an embodiment of any paragraph(s) of this summary, the plurality of receiver elements are ultra-short baseline receiver elements.

According to an embodiment of any paragraph(s) of this summary, the plurality of receiver elements include lead titanate.

According to an embodiment of any paragraph(s) of this summary, the integrated array is secured in a molding material to preserve the spacing of each of the plurality of receiver elements relative to the end cap.

According to an embodiment of any paragraph(s) of this summary, the molding material is a urethane.

According to an embodiment of any paragraph(s) of this summary, the molding material has a maximum diameter that is less than or equal to 3.81 centimeters and a maximum height that is less than or equal to 5.08 centimeters.

According to an embodiment of any paragraph(s) of this summary, the air-backed transmit element is cylindrical.

According to another aspect of the invention, a compact, integrated acoustic localization and communications array ("integrated array") mounted to a mounting surface is provided. The integrated array includes an air-backed transmit element having a first end on which an end cap is disposed, and a second end mounted to the mounting surface. The integrated array also includes a volumetric acoustic array including a plurality of receiver elements electrically integrated to the transmit element. The integrated is configured to transmit, via the transmit element, and receive, via the plurality of the receiver elements, an acoustic signal having a frequency in the range of 10 kHz to 50 kHz. Each of the plurality of receiver elements are spaced apart from the end cap and the mounting surface at least a first distance, the first distance being greater than ¼ of a wavelength associated with the frequency transmitted and received by the integrated array, and the first distance not being equal to an odd multiple of ¼ of the wavelength associated with the frequency transmitted and received by the integrated array. Each of the plurality of receiver elements are spaced apart from the mounting surface at least a second distance, the second distance being greater than ¼ of a wavelength associated with the frequency transmitted and received by the integrated array, and the second distance not being equal to an odd multiple of ¼ of the wavelength associated with the frequency transmitted and received by the integrated array.

According to an embodiment of any paragraph(s) of this summary, the volumetric acoustic array is a tetrahedral acoustic array.

According to an embodiment of any paragraph(s) of this summary, the plurality of receiver elements are ultra-short baseline receiver elements.

According to an embodiment of any paragraph(s) of this summary, the plurality of receiver elements include lead titanate.

According to an embodiment of any paragraph(s) of this summary, the integrated array is secured in a molding material to preserve the spacing of each of the plurality of receiver elements relative to the end cap.

According to an embodiment of any paragraph(s) of this summary, the molding material is a urethane.

According to an embodiment of any paragraph(s) of this summary, the molding material has a maximum diameter that is less than or equal to 3.81 centimeters and a maximum height that is less than or equal to 5.08 centimeters.

According to an embodiment of any paragraph(s) of this summary, the air-backed transmit element is cylindrical.

According to another aspect of the invention, a method of assembling a compact, integrated acoustic localization and communications array ("integrated array") is provided. The integrated array includes an air-backed transmit element having a first end on which an end cap is disposed and a second end configured to be mounted to a mounting surface. The integrated array also includes a volumetric acoustic array including a plurality of receiver elements electrically integrated to the transmit element. The method includes the step of positioning the plurality of receiver elements relative to each other in a first mold fixture to form the volumetric acoustic array of the plurality of receiver elements. The method also includes the step of securing the position of each of the plurality of receiver elements relative to each other in the mold fixture with a molding material to preserve the volumetric acoustic array of the plurality of receiver elements. The method also includes the step of positioning the preserved volumetric acoustic array relative to the end cap of the air-backed transmit element in a second mold fixture to form the integrated array. The method also includes the step of securing the position of the preserved volumetric acoustic array relative to the end cap of the air-backed transmit element with the molding material to preserve the integrated array. The integrated array is configured to transmit, via the transmit element, and receive, via the plurality of the receiver elements, an acoustic signal having a frequency in the range of 10 kHz to 50 kHz. The step of positioning the preserved volumetric acoustic array includes positioning the preserved volumetric acoustic array relative to the end cap such that each of the plurality of receiver elements in the volumetric acoustic array are spaced apart from the end cap at least a first distance. The first distance is greater than ¼ of a wavelength associated with the frequency transmitted and received by the integrated array, and the first distance is not equal to an odd multiple of ¼ of the wavelength associated with the frequency transmitted and received by the integrated array.

In an embodiment of the method, the method further includes the step of mounting the second end of the air-backed transmit element to the mounting surface. The step of positioning the preserved volumetric acoustic array relative to the end cap of the air-backed transmit element also includes positioning the preserved volumetric acoustic array relative to the mounting surface such that each of the plurality of receiver elements are spaced apart from the mounting surface at least a second distance. The second distance is greater than ¼ of a wavelength associated with the frequency transmitted and received by the compact, integrated acoustic localization and communications array, and the second distance is not equal to an odd multiple of ¼ of the wavelength associated with the frequency transmitted and received by the compact, integrated acoustic localization and communications array. The step of securing the position of the preserved volumetric acoustic array relative to the end cap of the air-backed transmit element also includes securing the position of the preserved volumetric acoustic array relative to the mounting surface with the molding material.

According to an embodiment of any paragraph(s) of this summary, the first mold fixture includes a plurality of sockets. Each socket is configured to receive one of the plurality of receiver elements. The step of positioning the plurality of receiver elements relative to each other includes a step of placing each of the plurality of receiver elements into their respective one of the plurality of sockets.

According to an embodiment of any paragraph(s) of this summary, the step of securing the position of each of the plurality of receiver elements relative to each other includes a step of pouring the molding material into the first mold fixture to fill the first mold fixture having the plurality of receiver elements positioned therein.

The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings show various aspects of the invention.

DETAILED DESCRIPTION

Figure 1:
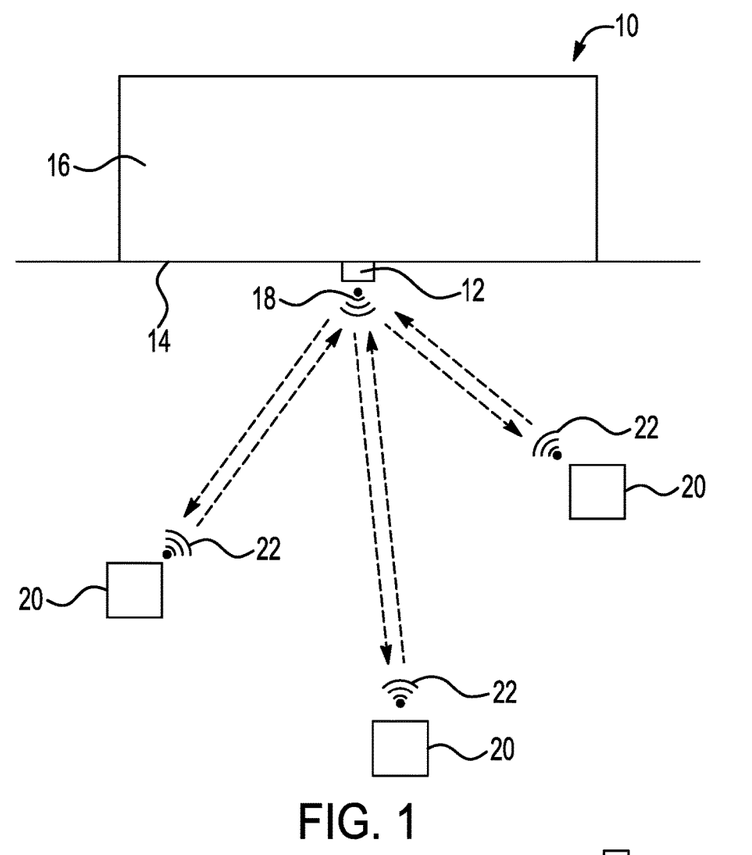
FIG. 1 is a schematic diagram of an exemplary USBL underwater acoustic localization and communications system.

Referring now to the figures, and initially to FIG. 1, FIG. 1 depicts a general schematic of an exemplary USBL underwater acoustic localization and communications system 10. Specifically, a compact, integrated acoustic localization and communications array 12, which will be described in more detail herein and referred to as "the integrated array 12," may be submerged and mounted on a mounting surface 14. In the illustrated embodiment, the mounting surface 14 is located on the bottom of a vessel 16 on the surface of a body of water. The integrated array 12 is configured to transmit a first acoustic signal 18 into the underwater environment. The acoustic signal 18 transmitted by the integrated array 12 may be received by at least one underwater object 20 having a transponder thereon. Upon receipt of the first acoustic signal 18, the transponder on the at least one underwater object 20 responds by transmitting a second acoustic signal 22 back to the integrated array 12. The integrated array 12 is configured to receive the second acoustic signal 22. The USBL underwater acoustic localization and communications system 10 is capable, therefore, of accurately measuring and calculating the position and distance of the at least one underwater object 20 relative to the integrated array 12.

Figure 2A:
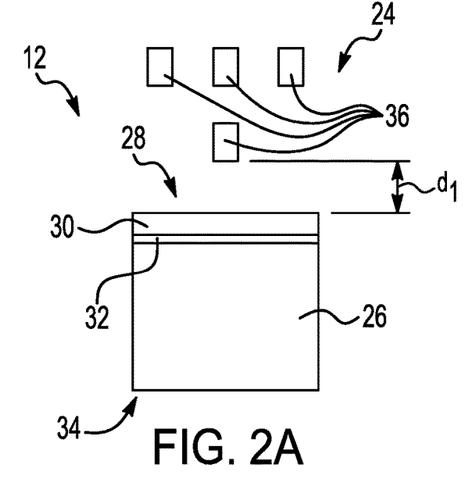
FIG. 2A is a side view of an exemplary compact, integrated acoustic localization and communications array.
Figure 2B:
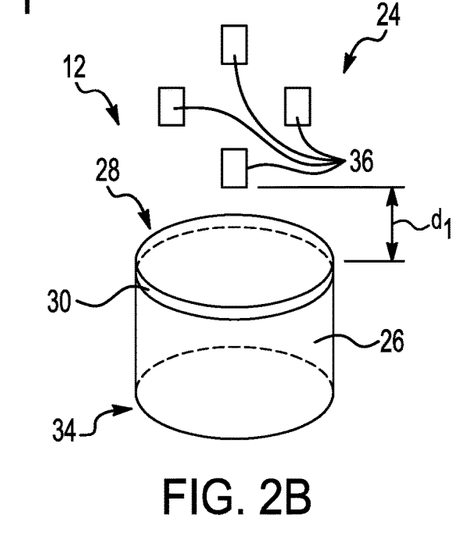
FIG. 2B is an oblique view of the exemplary compact, integrated acoustic localization and communications array of FIG. 2A.

Turning now to FIGS. 2A and 2B, the integrated array 12 will be described in more detail. The integrated acoustic array 12 includes a volumetric acoustic array 24 and an acoustic communication transmit element 26, which are configured to be integrated and packaged together in a low volume form factor. The transmit element 26 may be an air-backed, ceramic transmit element. That is, the transmit element 26 may have a structure and shape that is backed by air and mechanically isolated from the end cap and mounting surface with corprene (mixture of cork and neoprene). The air-backed transmit element 26 may operate more efficiently and have better directionality than, for example, a transmit element having a fluid filled cavity. In the illustrated embodiment, the air-backed transmit element 26 is cylindrical and has a hollow core at its axis. Other suitable structures and shapes for the transmit element 26 may include, for example, hemispherical, planar or spherical. In any embodiment, the transmit element 26 may be configured to transmit acoustic signals in a substantially omni-directional manner. The transmit element 26 may have a height that is 1.905 centimeters (0.75 inches).

In the illustrated embodiment, the air-backed ceramic transmit element 26 has a first end 28 on which an end cap 30 is disposed. The end cap 30 is configured to have a plurality of leads, or terminals (not shown), to which wires are connected to electrically couple each of the plurality of receiver elements 36 in the volumetric acoustic array 24 to the transmit element 26. The configuration and attachment of the wires to the leads, and the electrical integration to the plurality of receiver elements 36 to the transmit element 26, depending on application, will be understood by those having ordinary skill in the art. For example, the wires may be connected differently according to the polarity of the ceramic elements. In the illustrated embodiment of FIG. 2A, there is a seal ring 32 disposed between the transmit element 26 and the end cap 30. The seal ring 32 provides mechanical isolation between the end cap 30 and the transmit element 26, as well as a waterproof seal to prevent intrusion of water, or molding material (as will be introduced and described later), into the integrated acoustic array 12. In an embodiment, the seal may be made out of corprene (mixture of cork and neoprene). The air-backed transmit element 26 has a second end 34 configured to be mounted to the mounting surface 14.

The volumetric acoustic array 24 includes a plurality of ceramic receiver elements 36, such as USBL receiver elements, which are configured to be electrically coupled to the transmit element 26 via wires and the leads on the end cap 30, as previously described. The plurality of receiver elements 36 may, specifically, be made of lead titanate. The plurality of receiver elements 36 are positioned in a volumetric, or non-coplanar, configuration to together form the volumetric acoustic array 34. In the illustrated embodiment, the receiver elements 36 are positioned relative to each other in a tetrahedral configuration. The tetrahedral configuration is depicted in isolation in FIG. 3. In this tetrahedral configuration, including four receiver elements 36, three of the four illustrated receiver elements 36 are arranged in a same plane, and the remaining receiver element 36 is centrally positioned in a different plane, together forming the tetrahedral configuration. In other embodiments, the receiver elements 36 may be positioned in different volumetric, or non-coplanar, configuration.

The integrated array 12 is configured to transmit, via the transmit element 26, and receive, via the plurality of receiver elements 36 in the volumetric acoustic array 24, an acoustic signal having a frequency up to 50 kHz. For example, the integrated array 12 may be configured to transmit and receive an acoustic signal having a frequency in the range of 10 kHz to 50 kHz, 15 kHz to 45 kHz, 20 kHz to 40 kHz, 25 kHz to 35 kHz, or 35 kHz to 45 kHz.

Figure 3:
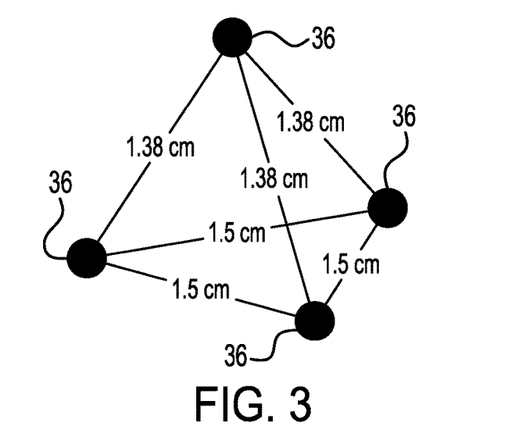
FIG. 3 is a schematic diagram of a tetrahedral configuration of receiver elements.

In the illustrated embodiment, wherein the receiver elements 36 are positioned relative to each other in a tetrahedral configuration, the baseline separation between co-planar receiver elements 36 is ½ of a wavelength associated with the frequency transmitted and received by the integrated array 12. The baseline separation between the non-coplanar element 36 and each of the co-planar elements 36 may be slightly under ½ of the wavelength associated with the frequency. The specific criteria for required baseline separation of receiver elements in a tetrahedral configuration is described in Beaujean et al. (Beaujean, Pierre-Philippe et al., *Acoustic positioning using a tetrahedral ultrashort baseline array of an acoustic modem source transmitting frequency-hopped sequences*, J. Acoust. Soc. Am., Vol. 121, No. 1, January 2007, 144-157).

In the integrated array 12, each of the plurality of receiver elements 36 are spaced apart from the end cap 30 at least a first distance $d_1$. The first distance $d_1$ is greater than ¼ of a wavelength associated with the frequency transmitted and received by the integrated array 12. The first distance $d_1$ also is not equal to an odd multiple of ¼ of the wavelength associated with the frequency transmitted and received by the integrated array 12.

Figure 4:
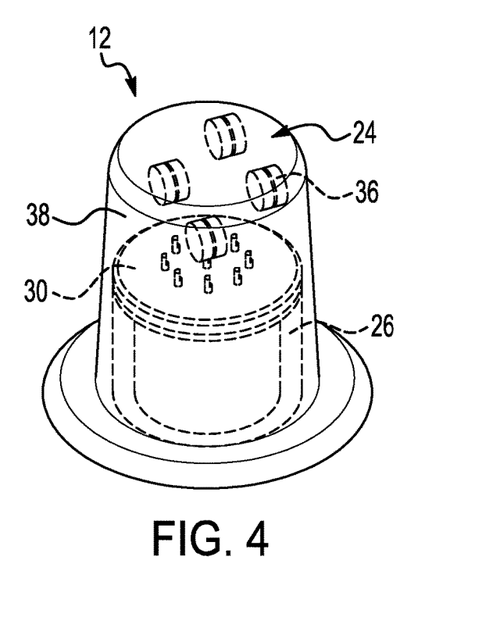
FIG. 4 is an oblique view of the exemplary compact, integrated acoustic localization and communications array of FIGS. 2A and 2B, secured in a molding compound.

The position of each of the plurality of receiver elements 36 in the volumetric acoustic array 24 may be secured and preserved in a molding material 38, as depicted in FIG. 4. The spacing of each of the plurality of receiver elements 36 relative to the end cap 30 may also be secured and preserved in the molding material 38, as depicted. The molding material may be, for example, a urethane such as polyurethane PR-1574. It will be appreciated, however, that other types of urethanes may be used. The molding material 38, securing and preserving the elements of the integrated array 12, when hardened, may have a maximum diameter that is less than or equal to 3.81 centimeters (1.5 inches) and may have a maximum height that is less than or equal to 5.08 centimeters (2 inches). Accordingly, the molding material 38 may serve as the small form factor packaging for the integrated array 12.

Figure 5A:
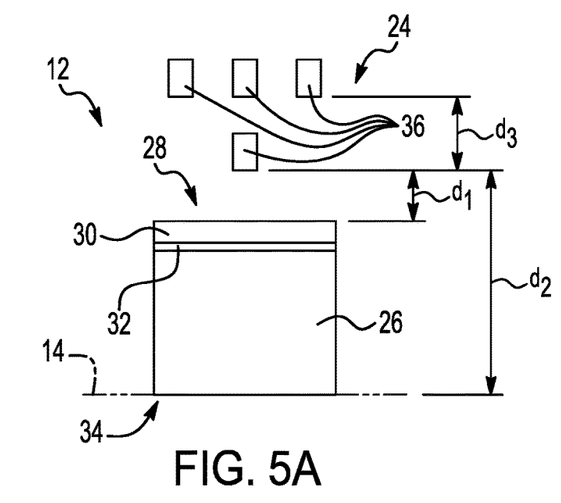
FIG. 5A is a side view of an exemplary compact, integrated acoustic localization and communications array mounted on a mounted surface.
Figure 5B:
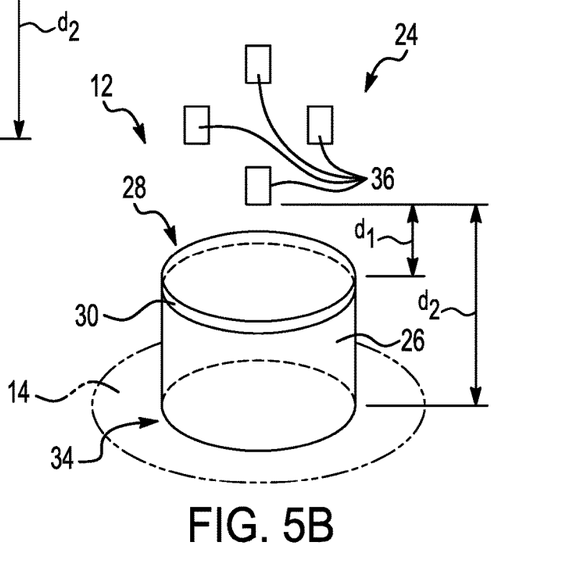
FIG. 5B is an oblique view of the exemplary compact, integrated acoustic localization and communications array of FIG. 5A.
Figure 6A:
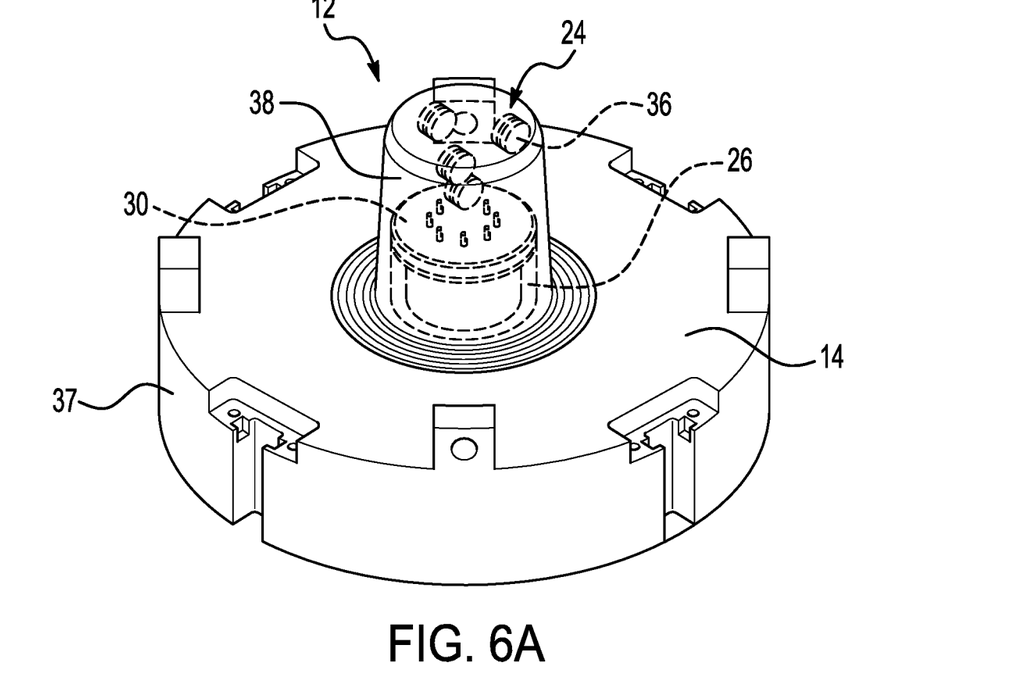
FIG. 6A is another perspective view of the exemplary compact, integrated acoustic localization and communications array of FIGS. 5A and 5B.
Figure 6B:
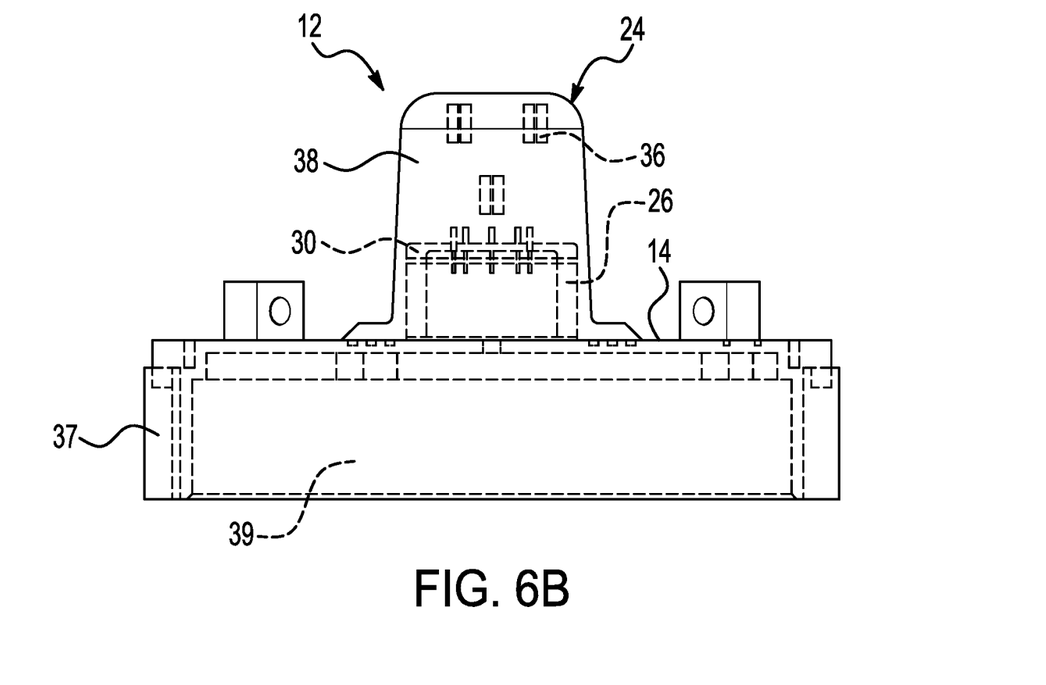
FIG. 6B is another oblique view of the exemplary compact, integrated acoustic localization and communications array of FIGS. 5A and 5B.

Now turning to FIGS. 5A and 5B, the integrated array 12 may be mounted to a mounting surface 14. In the illustrated embodiment, the second end 34 of the transmit element 26 is mounted to the mounting surface 14. A layer of coprene (mixture of cork and neoprene) may be disposed between the second end 34 of the transmit element 26 and the mounting surface 14 so as to provide mechanical isolation between the transmit element 26 and the mounting surface 14. As described earlier with reference to FIG. 1, the mounting surface 14 may be, for example, located on the bottom of a vessel 16 on the surface of the water, or submerged in the water. As depicted in FIGS. 6A and 6B, the mounting surface 14, more specifically, may be a surface of a housing 37. The housing 37 may have a cavity 39 therein for housing various electronic components that are to be coupled to the integrated array 12.

Each of the plurality of receiver elements 36 are spaced apart from the mounting surface 14 at least a second distance $d_2$. The second distance $d_2$ is also greater than ¼ of a wavelength associated with the frequency transmitted and received by the integrated array 12. The second distance $d_2$ also is not equal to an odd multiple of ¼ of the wavelength associated with the frequency transmitted and received by the integrated array 12.

Generally, the second distance $d_2$ must be sufficient to minimize destructive interference that occurs from sound pressure reflection off the mounting surface 14. This is particularly relevant when the acoustic array in the integrated array 12 is volumetric, such as the volumetric acoustic array 24 described herein, as spacing from each of the plurality of receiver elements 36 to the mounting surface 14 will not be the same. Discerning an optimal second distance $d_2$, therefore, may consist of computing the nulling frequency for each of the plurality of receiver elements 36 and selecting the second distance $d_2$ such that nulls do not occur in the frequency band of interest (i.e., the frequency at which the integrated array 12 is configured to transmit and receive acoustic signals).

Where c is the speed of sound in water and n is an odd number, the nulling frequency, $f_n$, is defined as:

$$f_n = c \frac{n}{4d}$$

In the illustrated embodiments in which the volumetric acoustic array 24 is a tetrahedral acoustic array, the optimal second distance $d_2$ may be discerned for the receiver element 36 that is positioned closest to the mounting surface 14, which may be considered the reference point. Where the distance between the reference point and the remaining receiver elements 36 is defined as the third distance $d_3$ (FIG. 5A), the second distance $d_2$ is discerned with explicit consideration of the third distance $d_3$, such that nulls do not occur in the frequency band of interest with respect to any receiver element 36 in the volumetric acoustic array 24.

Figure 7:
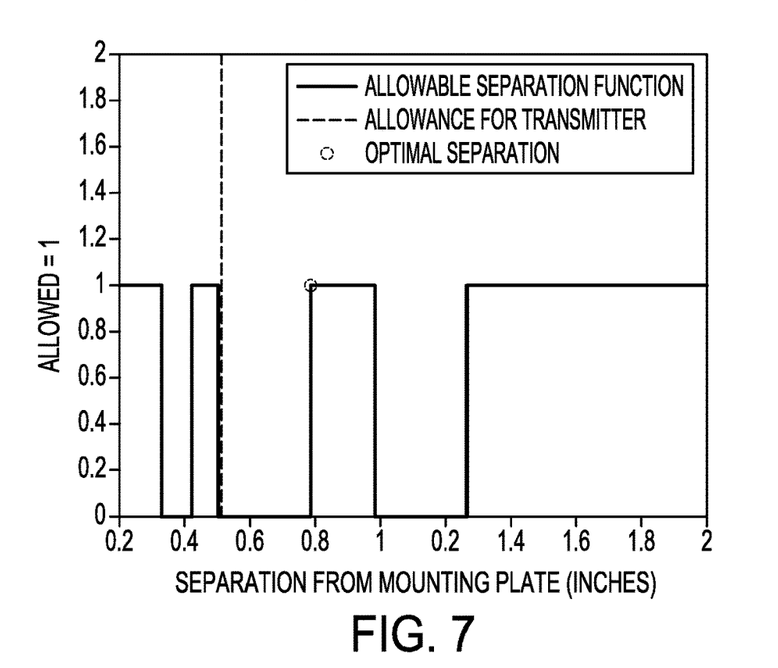
FIG. 7 is a graphical output of determining a second distance $d_2$ for spacing the plurality of receiver elements from the mounting surface.

With reference to FIG. 7, an example result is depicted of discerning an optimal second distance $d_2$, with explicit consideration of the third distance $d_3$, by evaluating the nulling frequency $f_n$ with the above equation for a tetrahedral acoustic array in the integrated array 12 configured to transmit and receive an acoustic signal having a frequency in the range of 35kHz to 45kHz. As illustrated in this example, the excluded values for the second distance $d_2$ are where the plotted separation function is equal to zero (i.e., where nulls at the desired frequency will occur). The values between these regions correspond to acceptable ranges for the second distance $d_2$. As illustrated in this example, while accounting for the distance taken up by the transmit element (dotted vertical line), as well as with explicit consideration of the third distance $d_3$, the closest range for the second distance $d_2$ in which no nulls will occur is between 1.98 centimeters (0.78 inches) and 2.49 centimeters (0.98 inches).

Figure 8:
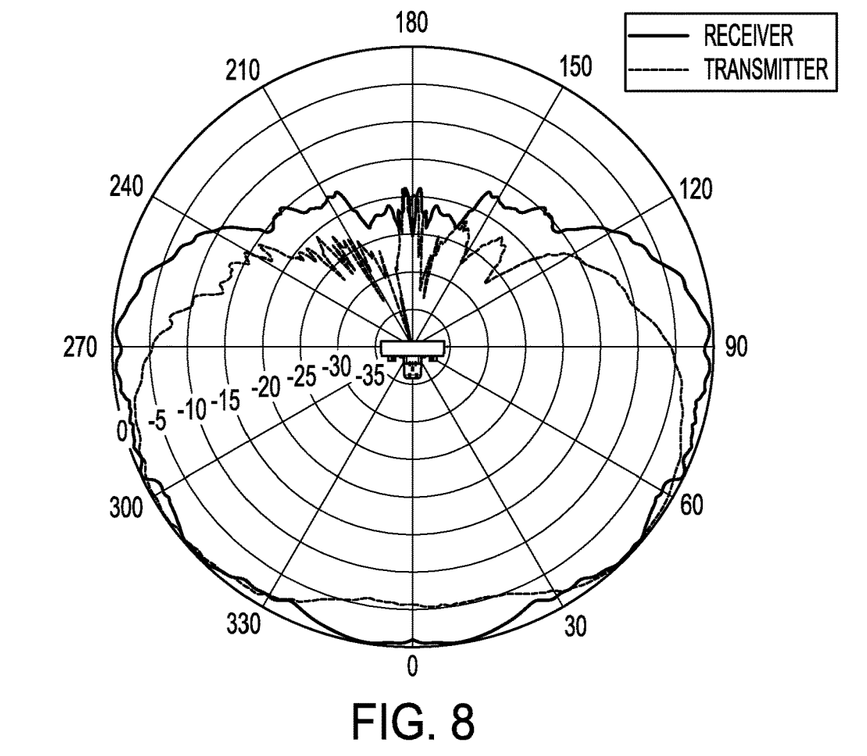
FIG. 8 is a graphical representation of a beam pattern created by the compact, integrated acoustic localization and communications array disclosed herein.

In use, the integrated array 12 is capable of transmitting and receiving an acoustic signal in a substantially omni-directional manner. For example, with reference to FIG. 8, an exemplary beam pattern for the integrated array 12 is depicted, representing a measure of the integrated array 12 performance. The outermost beam line represents the composite beam pattern of all 4 receiver elements 36 in the tetrahedral configuration and the innermost beam line represents the beam pattern of the transmit element 26. As depicted, the integrated array 12 achieves a substantially omni-directional operation performance in the lower hemisphere.

Figure 9:
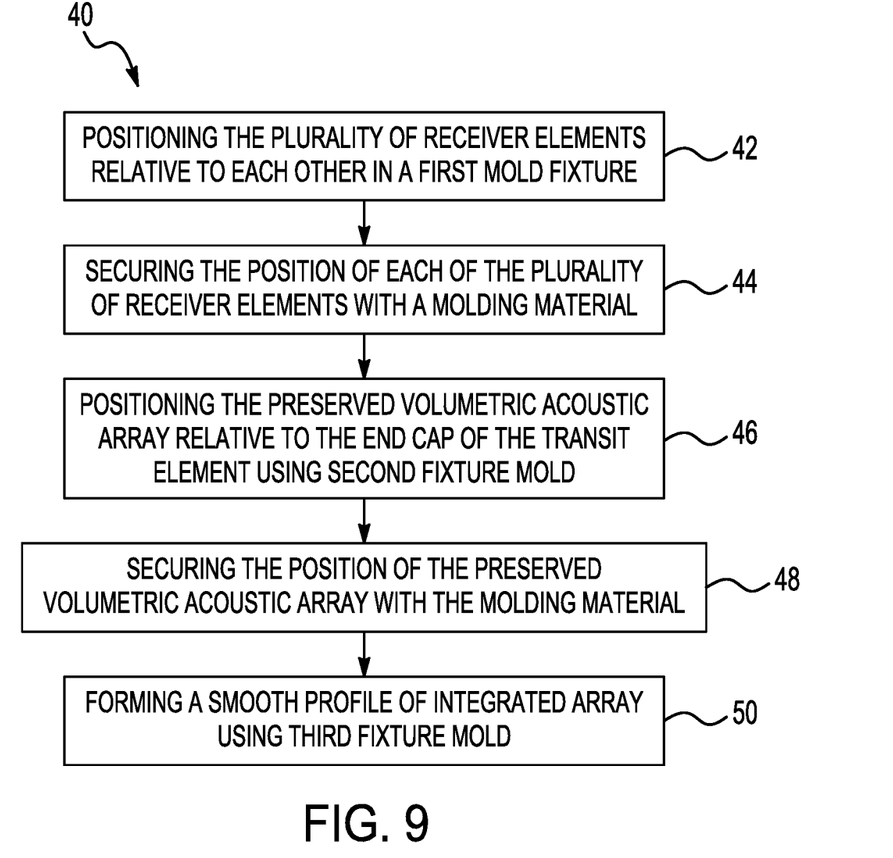
FIG. 9 is a high-level flow chart of a method of assembling a compact, integrated acoustic localization and communications array.

Now turning to FIG. 9, a method 40 of assembling the integrated array 12 (FIG. 2A) will be described. The integrated array 12, as previously described, includes the air-backed transmit element 26 (FIG. 2A) having the first end 28 (FIG. 2A) on which the end cap 30 (FIG. 2A) is disposed and the second end 34 (FIG. 2A) configured to be mounted to the mounting surface 14 (FIG. 5A). The integrated array 12 also includes the volumetric acoustic array 24 (FIG. 2A) including the plurality of receiver elements 36 (FIG. 2A) electrically integrated to the transmit element 26.

The method 40 includes, at step 42, positioning the plurality of receiver elements 36 (FIG. 2A) relative to each other in a first mold fixture to form the desired configuration of volumetric acoustic array 24 (FIG. 2A) of the plurality of receiver elements 36. At step 42, it will be appreciated that the receiver elements will already be pre-wired according to their required electrical connection to the transmit element. The first mold fixture may have a plurality of sockets, each configured to receive one of the plurality of differential receiver elements 36 therein. In an embodiment in which a tetrahedral acoustic array 24 is to be formed, the first mold fixture may have three sockets disposed in the same plane at the base of the mold fixture for receiving three of the receiver elements 36, while the fourth receiver element 36 is held in place in the mold fixture by a set screw therein. The set screw for receiving and holding the fourth receiver element may be, for example, centrally positioned in the mold fixture in a different plane than the three sockets at the base of the mold fixture. The step 42 of positioning the plurality of receiver elements 36 relative to each other in the first mold fixture may therefore include placing each of the plurality of receiver elements into their respective one of the plurality of sockets, or set screw, in the first mold fixture.

Figure 10:
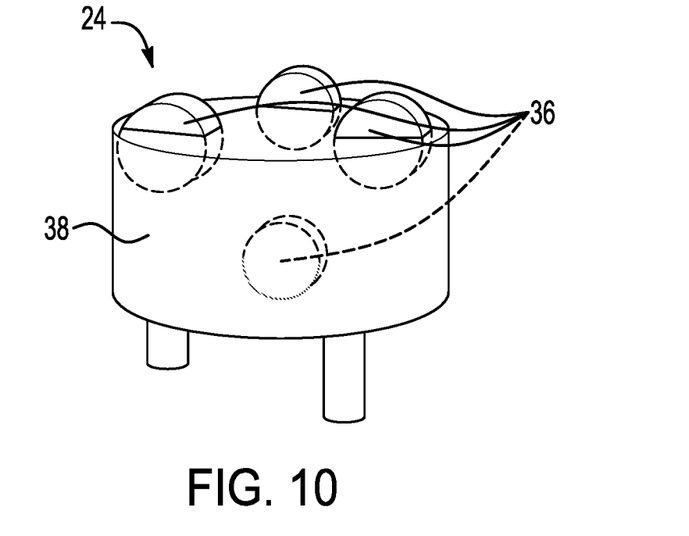
FIG. 10 is an oblique view of a plurality of receiver elements secured in a molding compound.

At step 44, the method 40 includes securing the position of each of the plurality of receiver elements 36 (FIG. 2A) relative to each other in the mold fixture with the molding material 38 (FIG. 4) to preserve the desired configuration of the volumetric acoustic array 24 (FIG. 2A) of the plurality of receiver elements 36. For example, the step 44 of securing the position of each of the plurality of receiver elements 36 relative to each other may include pouring the molding material 38 into the first mold fixture, having the plurality of receiver elements 36 positioned therein, to fill the first mold fixture. With brief reference to FIG. 10, an exemplary volumetric acoustic array 24, after having been secured in the molding material 38 at step 44 of the method 40 to form a section of the integrated array 12 (FIG. 2A) is depicted. As illustrated, each of the plurality of receiver elements 36 are secured in their respective positions relative to each other in the molding material 38 and will remain secured in their positions relative to each other throughout the remainder of the method 40 of assembly the integrated array 12. Stated differently, the volumetric acoustic array 24, with the precise spacing of receiver elements 36 relative to each other, will be preserved.

The method 40 additionally includes, at step 46, positioning the preserved volumetric acoustic array 24 (FIG. 2A) relative to the end cap 30 (FIG. 2A) of the air-backed transmit element 26 (FIG. 2A) in a second mold fixture to form the integrated array 12 (FIG. 2A). The second mold fixture may include a "U" fixture plate of specific thickness and keying features that align the volumetric acoustic array 24 to the correct height off the mounting plate 14, d2, and heading that orients volumetric acoustic array 24 relative to the chosen frame of reference.

As described earlier, the integrated array 12 (FIG. 2A) that is assembled by the method 40 is configured to transmit, via the transmit element 26, and receive, via the volumetric acoustic array 24 (FIG. 2A) of the plurality of receiver elements 36 (FIG. 2A), an acoustic signal having a frequency up to 50kHz. For example, the integrated array 12 may be configured to transmit and receive an acoustic signal having a frequency in the range of 10 kHz to 50 kHz, 15 kHz to 45 kHz, 20 kHz to 40 kHz, 25 kHz to 35 kHz, or 35 kHz to 45 kHz.

The step 46 of positioning the preserved volumetric acoustic array 24 (FIG. 2A) includes positioning the preserved volumetric acoustic array 24 relative to the end cap 30 (FIG. 2A) such that each of the plurality of receiver elements 36 (FIG. 2A) in the volumetric acoustic array 24 are spaced apart from the end cap at least the first distance $d_1$. As previously described, the first distance $d_1$ is greater than ¼ of the wavelength associated with the frequency transmitted and received by the integrated array 12. The first distance $d_1$ also is not equal to an odd multiple of ¼ of the wavelength associated with the frequency transmitted and received by the integrated array 12.

At step 48, the method 40 includes securing the position of the preserved volumetric acoustic array 24 (FIG. 2A) relative to the end cap 30 (FIG. 2A) of the air-backed transmit element 26 with the molding material 38 (FIG. 4) to preserve the integrated array 12.

The method 40 may additionally include mounting the second end 34 (FIG. 5A) of the air-backed transmit element 26 (FIG. 5A) to the mounting surface 14 (FIG. 5A). In this embodiment, the step 46 of positioning the preserved volumetric acoustic array 24 (FIG. 5A) relative to the end cap 30 (FIG. 5A) of the air-backed transmit element 26 includes positioning the preserved volumetric acoustic array 24 relative to the mounting surface 14 such that each of the plurality of receiver elements 36 are spaced apart from the mounting surface 14 at least a second distance $d_2$. As previously described, the second distance $d_2$ is also greater than ¼ of the wavelength associated with the frequency transmitted and received by the integrated array 12. The second distance $d_2$ also is not equal to an odd multiple of ¼ of the wavelength associated with the frequency transmitted and received by the integrated array 12.

Figure 11:
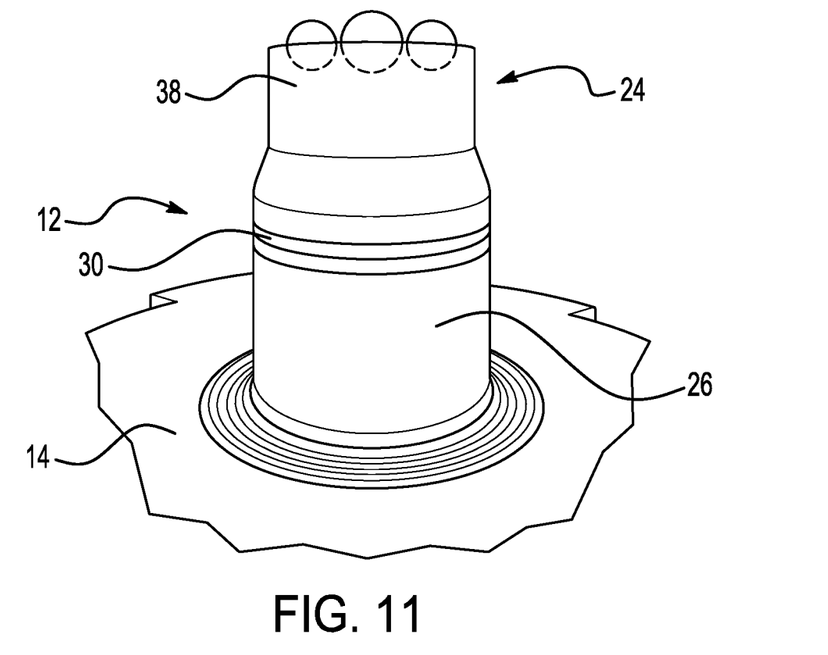
FIG. 11 is an oblique view of an exemplary compact, integrated acoustic localization and communications array secured in a molding compound.

In this embodiment, the step 48 of securing the position of the preserved volumetric acoustic array 24 (FIG. 5A) relative to the end cap 30 (FIG. 5A) of the air-backed transmit element 26 (FIG. 5A) includes securing the position of the preserved volumetric acoustic array 24 relative to the mounting surface 14 (FIG. 5A) with the molding material 38 (FIG. 4). With brief reference to FIG. 11, an exemplary integrated array 12 is depicted, with the second end 34 of the air-backed transmit element 26 being mounted to the mounting surface 14 and the position of the preserved volumetric acoustic array 24 being positioned and secured relative to both the end cap 30 and the mounting surface 14 by the molding material 38.

Figure 12:
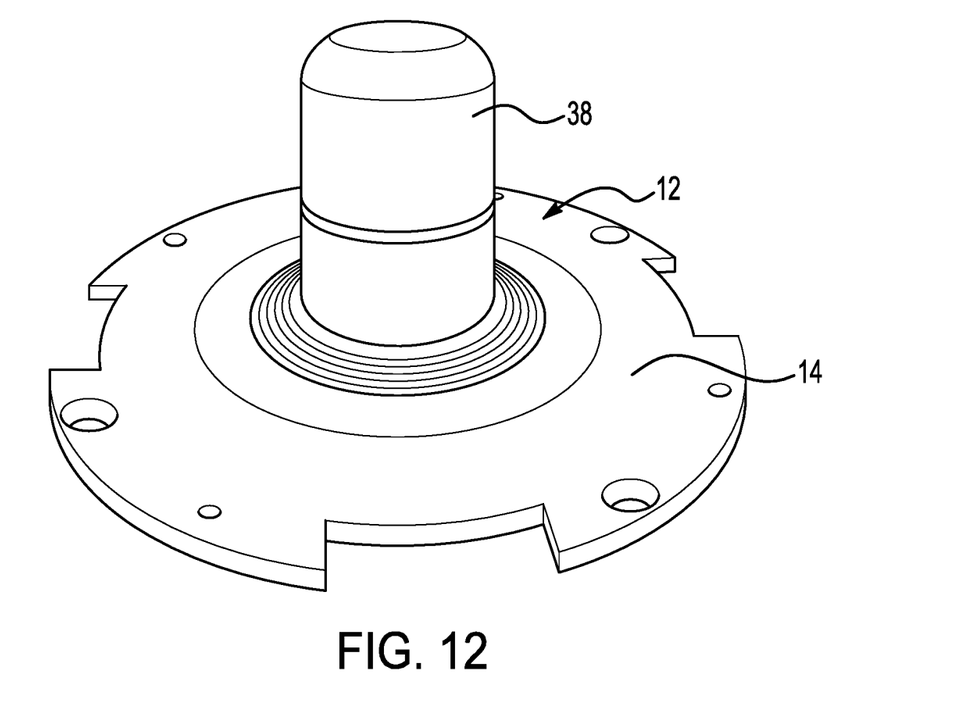
FIG. 12 is another oblique view of an exemplary compact, integrated acoustic localization and communications array secured in a molding compound.

The method 40 may additionally include a step 50 of forming a smooth profile of the formed integrated array 12 with more of the molding compound. This step 50 is performed with the use of a third fixture mold to achieve the maximum dimensions (diameter and height) of the integrated array 12. An exemplary integrated array 12 assembled according to the method 40 described herein is depicted in FIG. 12. As illustrated, the integrated array 12 assembled according to the method 40 may have a maximum diameter that is less than or equal to 3.81 centimeters (1.5 inches) and may have a maximum height that is less than or equal to 5.08 centimeters (2 inches).

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A compact, integrated acoustic localization and communications array, comprising:
    an air-backed transmit element having a first end on which an end cap is disposed, and a second end configured to be mounted to a mounting surface; and
    a volumetric acoustic array including a plurality of receiver elements electrically integrated to the transmit element, each of the plurality of receiver elements are configured to be spaced further from the mounting surface than the end cap;

wherein the compact, integrated acoustic localization and communications array is configured to transmit, via the transmit element, and receive, via the plurality of the receiver elements, an acoustic signal having a frequency in the range of 10 kHz to 50 kHz; and wherein each of the plurality of receiver elements are spaced apart from the end cap at least a distance, the distance being greater than ¼ of a wavelength associated with the frequency transmitted and received by the compact, integrated acoustic localization and communications array, and the distance not being equal to an odd multiple of ¼ of the wavelength associated with the frequency transmitted and received by the compact, integrated acoustic localization and communications array.

2. The compact, integrated acoustic localization and communications array according to claim 1, wherein the volumetric acoustic array is a tetrahedral acoustic array.

3. The compact, integrated acoustic localization and communications array according to claim 1, wherein the plurality of receiver elements are ultra-short baseline receiver elements.

4. The compact, integrated acoustic localization and communications array according to claim 1, wherein the plurality of receiver elements include lead titanate.

5. The compact, integrated acoustic localization and communications array according to claim 1, wherein the compact, integrated acoustic localization and communications array is secured in a molding material to preserve the spacing of each of the plurality of receiver elements relative to the end cap.

6. The compact, integrated acoustic localization and communications array according to claim 5, wherein the molding material is a urethane.

7. The compact, integrated acoustic localization and communications array according to claim 5, wherein the molding material has a maximum diameter that is less than or equal to 3.81 centimeters and a maximum height that is less than or equal to 5.08 centimeters.

8. The compact, integrated acoustic localization and communications array according to claim 1, wherein the air-backed transmit element is cylindrical.

9. A compact, integrated acoustic localization and communications array mounted to a mounting surface, the compact, integrated acoustic localization and communications array comprising:
    an air-backed transmit element having a first end on which an end cap is disposed, and a second end mounted to the mounting surface; and
    a volumetric acoustic array including a plurality of receiver elements electrically integrated to the transmit element, each of the plurality of receiver elements are configured to be spaced further from the mounting surface than the end cap;
    wherein the compact, integrated acoustic localization and communications array is configured to transmit, via the transmit element, and receive, via the plurality of the receiver elements, an acoustic signal having a frequency in the range of 10 kHz to 50 kHz;
    wherein each of the plurality of receiver elements are spaced apart from the end cap and the mounting surface at least a first distance, the first distance being greater than ¼ of a wavelength associated with the frequency transmitted and received by the compact, integrated acoustic localization and communications array, and the first distance not being equal to an odd multiple of ¼ of the wavelength associated with the frequency transmitted and received by the compact, integrated acoustic localization and communications array; and
    wherein each of the plurality of receiver elements are spaced apart from the mounting surface at least a second distance, the second distance being greater than ¼ of a wavelength associated with the frequency transmitted and received by the compact, integrated acoustic localization and communications array, and the second distance not being equal to an odd multiple of ¼ of the wavelength associated with the frequency transmitted and received by the compact, integrated acoustic localization and communications array.

10. The compact, integrated acoustic localization and communications array according to claim 9, wherein the volumetric acoustic array is a tetrahedral acoustic array.

11. The compact, integrated acoustic localization and communications array according to claim 9, wherein the plurality of receiver elements are ultra-short baseline receiver elements.

12. The compact, integrated acoustic localization and communications array according to claim 9, wherein the plurality of receiver elements include lead titanate.

13. The compact, integrated acoustic localization and communications array according to claim 9, wherein the compact, integrated acoustic localization and communications array is secured in a molding material to preserve the spacing of each of the plurality of receiver elements relative to the end cap.

14. The compact, integrated acoustic localization and communications array according to claim 13, wherein the molding material is a urethane.

15. The compact, integrated acoustic localization and communications array according to claim 13, wherein the molding material has a maximum diameter that is less than or equal to 3.81 centimeters and a maximum height that is less than or equal to 5.08 centimeters.

16. The compact, integrated acoustic localization and communications array according to claim 9, wherein the air-backed transmit element is cylindrical.

17. A method of assembling a compact, integrated acoustic localization and communications array, the compact, integrated acoustic localization and communications array including an air-backed transmit element having a first end on which an end cap is disposed and a second end configured to be mounted to a mounting surface, the compact, integrated acoustic localization and communications array also including a volumetric acoustic array including a plurality of receiver elements electrically integrated to the transmit element, each of the plurality of receiver elements are configured to be spaced further from the mounting surface than the end cap, the method comprising the steps of:
    positioning the plurality of receiver elements relative to each other in a first mold fixture to form the volumetric acoustic array of the plurality of receiver elements, wherein each of the plurality of receiver elements are positioned such that they are configured to be spaced further from the mounting surface than the end cap;
    securing the position of each of the plurality of receiver elements relative to each other in the mold fixture with a molding material to preserve the volumetric acoustic array of the plurality of receiver elements;
    positioning the preserved volumetric acoustic array relative to the end cap of the air-backed transmit element in a second mold fixture to form the compact, integrated acoustic localization and communications array; and securing the position of the preserved volumetric acoustic array relative to the end cap of the air-backed transmit element with the molding material to preserve the compact, integrated acoustic localization and communications array;

wherein the compact, integrated acoustic localization and communications array is configured to transmit, via the transmit element, and receive, via the plurality of the receiver elements, an acoustic signal having a frequency in the range of 10 kHz to 50 kHz; and wherein the step of positioning the preserved volumetric acoustic array includes positioning the preserved volumetric acoustic array relative to the end cap such that each of the plurality of receiver elements in the volumetric acoustic array are spaced apart from the end cap at least a first distance, the first distance being greater than ¼ of a wavelength associated with the frequency transmitted and received by the compact, integrated acoustic localization and communications array, and the first distance not being equal to an odd multiple of ¼ of the wavelength associated with the frequency transmitted and received by the compact, integrated acoustic localization and communications array.

18. The method according to claim 17, further comprising the step of mounting the second end of the air-backed transmit element to the mounting surface, wherein the step of positioning the preserved volumetric acoustic array relative to the end cap of the air-backed transmit element also includes positioning the preserved volumetric acoustic array relative to the mounting surface such that each of the plurality of receiver elements are spaced apart from the mounting surface at least a second distance, the second distance being greater than ¼ of a wavelength associated with the frequency transmitted and received by the compact, integrated acoustic localization and communications array, and the second distance not being equal to an odd multiple of ¼ of the wavelength associated with the frequency transmitted and received by the compact, integrated acoustic localization and communications array; and wherein the step of securing the position of the preserved volumetric acoustic array relative to the end cap of the air-backed transmit element also includes securing the position of the preserved volumetric acoustic array relative to the mounting surface with the molding material.

19. The method according to claim 17, wherein the first mold fixture includes a plurality of sockets, each socket configured to receive one of the plurality of receiver elements, and wherein the step of positioning the plurality of receiver elements relative to each other includes a step of placing each of the plurality of receiver elements into their respective one of the plurality of sockets.

20. The method according to claim 17, wherein the step of securing the position of each of the plurality of receiver elements relative to each other includes a step of pouring the molding material into the first mold fixture to fill the first mold fixture having the plurality of receiver elements positioned therein.

* * * * *